(12) United States Patent
Eade

(10) Patent No.: US 10,494,051 B2
(45) Date of Patent: Dec. 3, 2019

(54) HANDLEBARS AND RELATED METHODS

(71) Applicant: Peter J. Eade, West Hollywood, CA (US)

(72) Inventor: Peter J. Eade, West Hollywood, CA (US)

(*) Notice: Subject to any disclaimer, the term of this patent is extended or adjusted under 35 U.S.C. 154(b) by 0 days.

(21) Appl. No.: 15/395,904

(22) Filed: Dec. 30, 2016

(65) Prior Publication Data
US 2017/0225739 A1    Aug. 10, 2017

Related U.S. Application Data

(63) Continuation-in-part of application No. 29/554,241, filed on Feb. 9, 2016, now Pat. No. Des. 830,926.

(51) Int. Cl.
*B62K 21/12*    (2006.01)

(52) U.S. Cl.
CPC ..................... *B62K 21/12* (2013.01)

(58) Field of Classification Search
CPC ....................................... B62K 21/12
See application file for complete search history.

(56) References Cited

U.S. PATENT DOCUMENTS

| | | |
|---|---|---|
| D30,821 S | 5/1899 | Scandrett |
| D96,636 S | 8/1935 | Van Doren et al. |
| D101,953 S | 11/1936 | Henry |
| D104,819 S | 3/1937 | Snell |
| D179,273 S | 11/1956 | Stevens |
| D208,448 S | 8/1967 | Fritz |
| D224,696 S | 8/1972 | Pawsat et al. |
| D247,170 S | 2/1978 | Heber |
| 4,380,093 A | 4/1983 | Morgan |
| 4,445,396 A | 5/1984 | Shimano |
| 4,503,729 A * | 3/1985 | Shimano ................ B62K 21/12 74/551.1 |
| 4,522,083 A | 6/1985 | Morgan |
| D298,930 S | 12/1988 | Most |
| D301,027 S | 5/1989 | Borromeo |
| 5,083,476 A | 1/1992 | Borromeo |
| D323,805 S | 2/1992 | Giard, Jr. |
| 5,146,809 A | 9/1992 | Ruana |
| 5,165,301 A | 11/1992 | Jeshurun |
| D337,748 S | 7/1993 | Adams |
| D342,046 S | 12/1993 | Chen |
| D345,955 S | 4/1994 | Jeshurun |
| D346,145 S | 4/1994 | Jeshurun |
| D346,574 S | 5/1994 | Jeshurun et al. |
| D347,613 S | 6/1994 | Jeshurun et al. |
| 5,524,506 A | 6/1996 | Terry |
| 6,182,529 B1 | 2/2001 | White |
| 6,374,697 B1 | 4/2002 | Brandl et al. |
| 6,467,372 B2 | 10/2002 | Klieber |
| 6,546,827 B2 | 4/2003 | Irie |
| 6,907,952 B2 | 6/2005 | Jones |
| 6,941,834 B2 | 9/2005 | Irie |
| 7,010,835 B2 | 3/2006 | Tillim |
| 2008/0110291 A1 | 5/2008 | Vitek |

(Continued)

*Primary Examiner* — Thomas C Diaz
(74) *Attorney, Agent, or Firm* — Buche & Associates, P.C.; John K. Buche; Bryce A. Johnson

(57) ABSTRACT

Disclosed are versatile and ergonomic handlebars that accommodate various posturing of a cyclist and handling of a bike during distance or endurance riding. The handlebars feature a center bar, tops, ramps, hooks, and drops.

4 Claims, 6 Drawing Sheets

(56) References Cited

U.S. PATENT DOCUMENTS

2009/0095116 A1    4/2009   Barnes et al.
2009/0282946 A1   11/2009   Bigolin
2011/0100154 A1    5/2011   Johnson

* cited by examiner

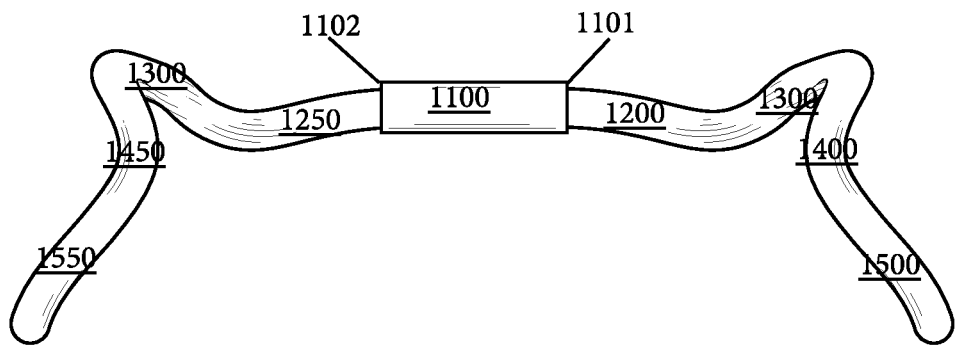
FIG. 2
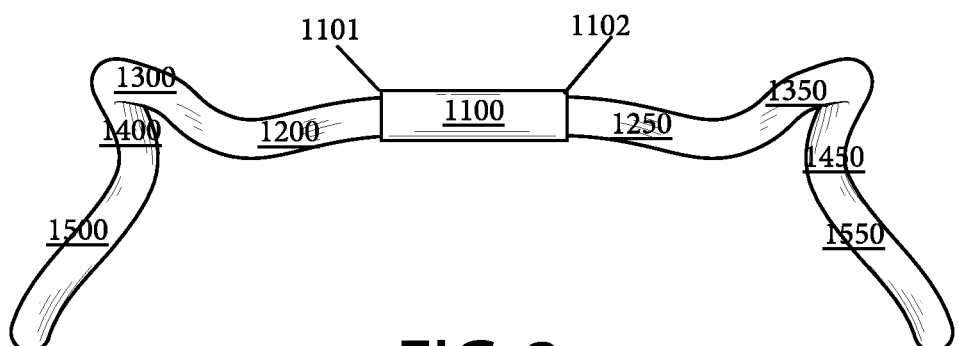
FIG. 3
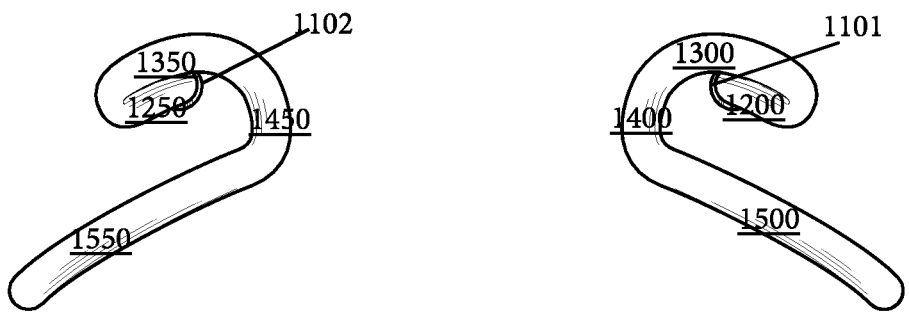
FIG. 4
FIG. 5

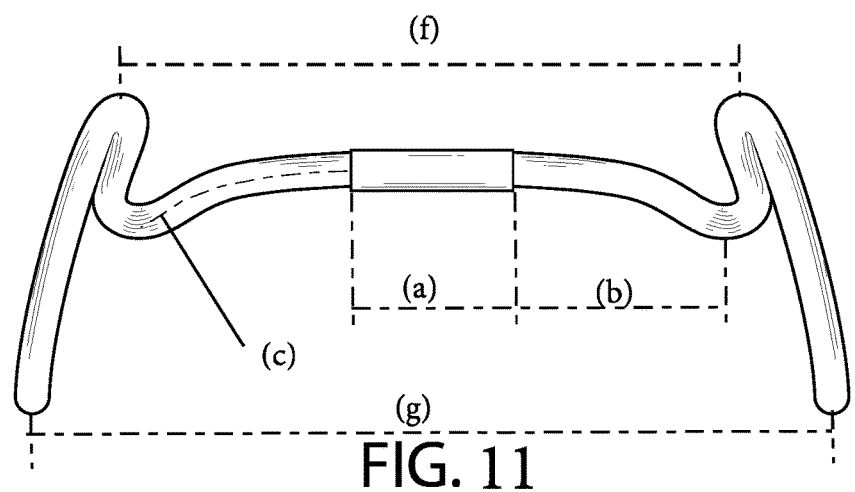
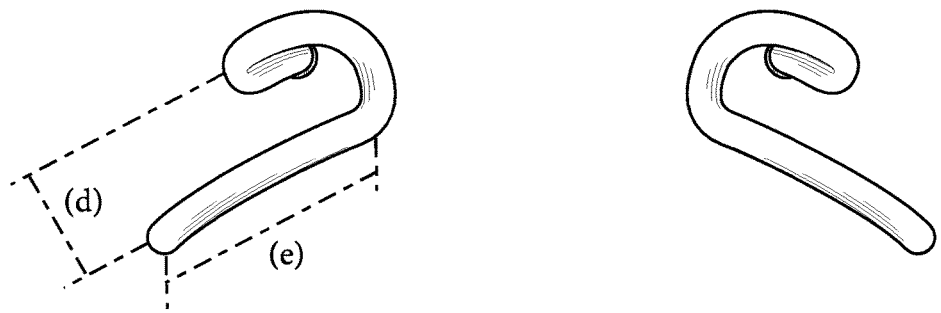
FIG. 11
FIG. 12

HANDLEBARS AND RELATED METHODS

CROSS-REFERENCE TO RELATED APPLICATIONS

This application is a continuation-in-part of U.S. Des. patent application Ser. No. 29/554,241 (filed Feb. 5, 2016) entitled "Handlebars."

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO AN APPENDIX SUBMITTED ON A COMPACT DISC AND AN INCORPORATED BY REFERENCE OF THE MATERIAL ON THE COMPACT DISC

Not applicable.

STATEMENT REGARDING PRIOR DISCLOSURES BY THE INVENTOR OR A JOINT INVENTOR

Reserved for a later date, if necessary.

BACKGROUND OF THE INVENTION

Field of Invention

The disclosed subject matter is in the field of handlebars for bicycles.

Background of the Invention

Cycling (sometimes called bicycling or biking) is the riding of a two-wheeled bicycle or bike for transportation, recreation, fitness, or sport. Cycling can involve the riding of a bike over long distances. For instance, the sport of distance or endurance cycling can involve riding a bike for a hundred miles or more in a single ride. Over any distance, a comfortable, aerodynamic, and leveraged (e.g., power transfer to pedals) posture of the rider, as well as, handling, stability, and reliability of the bicycle, are primary concerns.

In view of the foregoing, many bikes are designed for stability and reliability particularly after customized placement of the seat, frame, and handlebars of the cyclist's bicycle. However, the type of handle bar selected is important for both handling the bike and for maintaining the cyclist's body in a desirable posture (e.g., comfortable, leveraged, or aerodynamic). Moreover, the desired posture of the cyclist and handling position may vary over the course of a ride. For instance, a cyclist may use an aggressive posture (where the cyclist is seated with a forward lean over and against the handlebars) when speed or uphill climbing is needed or a relaxed posture (where the cyclist is seated upright and propped by outstretched arms against the handlebars) during slower or downhill rides. Thus, versatile handlebars are needed for accommodating various posturing of the cyclist and handling of the bike, particularly during distance or endurance riding.

In addition to accommodating the posturing of a cyclist and handling of a bike, handlebars are crucial for the grip-comfort of a cyclist. Gripping handle bars for long periods of time, like during distance or endurance cycling, can cause discomfort over time if said handlebars are not ergonomically designed. Therefore, a need exits for versatile and ergonomic handlebars that accommodate various posturing of a cyclist and handling of a bike during distance or endurance riding.

Many types of handlebars are known. For instance, "Flat bars" are typically a tube or bar that is straight or slightly bent toward the rider when positioned on the center clamp or handlebar stem of the bike frame. "Riser bars" are flat bars that rise upward from the center clamp of the bike frame. "Bull horn" handlebars are flat bars with ends that are (1) bent forward (away from the rider) and (2) curved upward. "Drop bars" are flat bars with ends that are (1) bend downward and (2) curved backward (toward the rider); whereas, "Aero bars" are two parallel bars that extend forward and backward for supporting the forearms of a rider. Further still, "Cruiser bars" are flat bars with a large sweep or curve toward the rider, and "Butterfly bars" are flat bars with ends that loop upward and downward. While each of the foregoing have meaningful uses, none of these bars adequately satisfy the identified need for versatile and ergonomic handle bars.

SUMMARY OF THE INVENTION

In view of the foregoing, an object of this specification is to disclose versatile and ergonomic handlebars that accommodate various posturing of a cyclist and handling of a bike during distance or endurance riding. In one embodiment, disclosed are handlebars comprising: a center bar for coupling said handle bars to the frame of vehicle; at least one top that extends laterally from said center bar, said top featuring a yaw angle of negative fifteen to negative twenty-five degrees relative to a yaw base-line, a pitch angle of negative twenty-five to negative forty degrees relative to a pitch base-line, and a roll angle of negative fifteen to negative twenty-five degrees relative to a roll base-line; at least one ramp that is seamlessly coupled to said top, said ramp featuring a yaw angle of seventy-five to eighty-five degrees relative to the yaw base-line, a pitch angle of twenty-five to forty degrees relative to the pitch base-line, and a roll angle of twenty-five to forty degrees relative to the roll base-line; at least one hook that is seamlessly coupled to said ramp, said hook featuring a yaw angle of seventy-five to eighty-five degrees relative to the yaw base-line, a pitch angle of twenty-five to forty degrees relative to the pitch base-line, and a roll angle of negative twenty-five to negative sixty degrees relative to the roll base-line; and, at least one drop that is seamlessly coupled to the hook.

BRIEF DESCRIPTION OF THE SEVERAL VIEWS OF THE DRAWINGS

Other objectives of the disclosure will become apparent to those skilled in the art once the invention has been shown and described. The manner in which these objectives and other desirable characteristics can be obtained is explained in the following description and attached figures in which:

FIG. 2 is a front view of the handlebars of FIG. 1A;

FIG. 3 is a rear view of the handlebars of FIG. 1A;

FIG. 4 is a right side view of the handlebars of FIG. 1A;

FIG. 5 is a left side view of the handlebars of FIG. 1A;

FIG. 11 is another dimensioned bottom view of the handlebars of FIG. 1A; and,

FIG. 12 is another dimensioned left and right side view of the handlebars of FIG. 1A.

It is to be noted, however, that the appended figures illustrate only typical embodiments of this invention and are therefore not to be considered limiting of its scope, for the invention may admit to other equally effective embodiments that will be appreciated by those reasonably skilled in the relevant arts. Also, figures are not necessarily made to scale but are representative.

DETAILED DESCRIPTION OF PREFERRED EMBODIMENTS

Disclosed are versatile and ergonomic handlebars that accommodate various posturing of a cyclist and handling of a bike during distance or endurance riding. The handlebars feature a center bar, tops, ramps, hooks, and drops. The more specific details of the disclosed handle bars are described in connection with the figures.

Figure 1A:
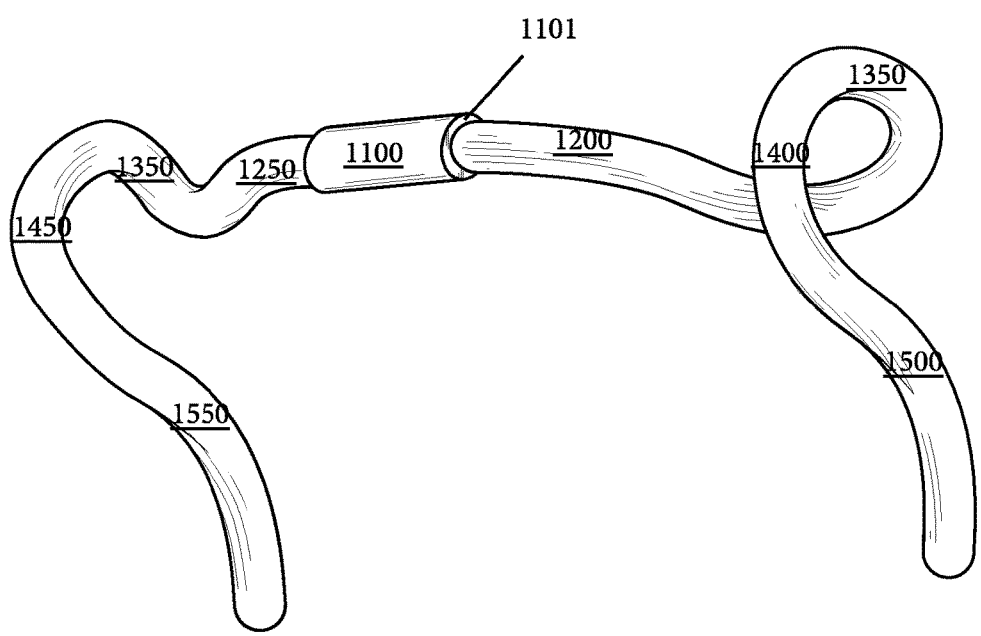
FIG. 1A is a perspective view of handlebars.

FIG. 1A is a perspective view of a preferred embodiment of the disclosed handlebars 1000. FIGS. 2 through 7 are respectively a front view, a rear view, a right side view, a left side view, a top view, and a bottom view of the handlebars 1000 of FIG. 1A. As shown in these figures, the handle bars are defined by a bar center 1100; a left top 1200; a right top 1250; a left ramp 1300; a right ramp 1350; a left hook 1400; a right hook 1450; a left drop 1500; and a right drop 1550. As shown, the handlebars 1000 generally resemble drop-bar-type handlebars, where identified structures extend laterally, forward, downward, and backward (in that order) from the bar center 1100, however, the instant application features various critical distinctions that make meaningful differences in rider comfort.

As shown in FIGS. 1A, 2, 3, 6 and 7 the center bar 1100 of the handlebar 1000 is defined by a straight tube or cylinder. Although shown as a cylinder with a circular cross-section, the center bar 1100 may suitably be variations of the shape, like a block with a rectangular cross section. Suitably, the center bar 1100 is configured for being coupled to a center clamp (not shown) or handlebar stem (not shown) of a bike frame (not shown).

Still referring to FIGS. 1A, 2, 3, 6 and 7, the left top 1200 is generally tubular and extends laterally from the left side of the center bar 1100. As shown, the right side of the left top 1200 is coupled (e.g., by welding, splicing, adhesive or unitary construction) to the left side of center bar 1100 so that the tubular axis or center of the left top 1200 is aligned with the left side axis of the center bar 1000. As shown, the joint of the center bar 1100 and left top 1200 forms a lip 1101 where the diameter of the left top 1200 and center bar 1100 are different. In the figures, the lip 1101 is projected across the center bar 1100 (i.e., the center bar 1100 has a larger diameter than the tube of the left top 1200) but in alternate embodiments that are not depicted, the lip 1101 may be recessed across the center bar 1100 (i.e., the center bar 1100 has a larger diameter than the tube of the left top 1200).

Yet still referring to FIGS. 1A, 2, 3, 6 and 7, the right top 1250 is generally tubular and extends laterally from the right side of the center bar 1100. As shown, the left side of the right top 1250 is coupled (e.g., by welding, splicing, adhesive or unitary construction) to the right side of the center bar 1100 so that the tubular axis or center of the right top 1250 is aligned with the right side axis of the center bar 1000. As shown, the joint of the center bar 1100 and right top 1200 forms a lip 1102 where the diameter of the right top 1250 and center bar 1100 are different. In the figures, the lip 1102 is projected across the center bar 1100 (i.e., the center bar 1100 has a larger diameter than the tube of the right top 1250) but in alternate embodiments that are not depicted, the lip 1102 may be recessed across the center bar 1100 (i.e., the center bar 1100 has a larger diameter than the tube of the right top 1250).

Figure 1B:
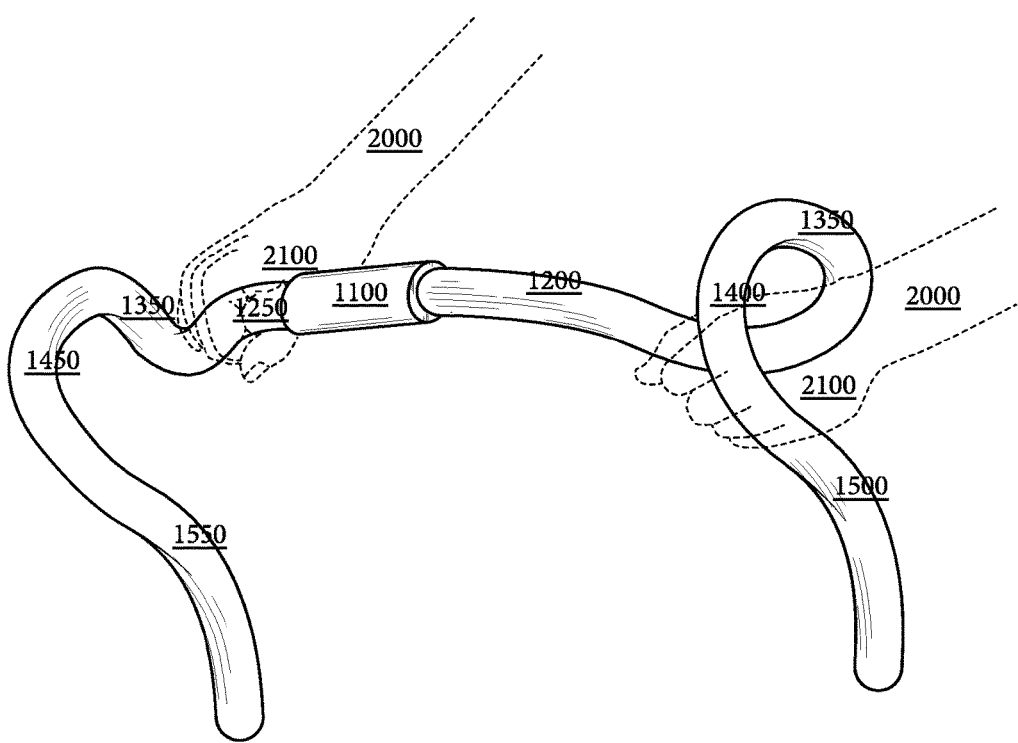
FIG. 1B is an environmental perspective view the handle bars of FIG. 1A.
Figure 6:
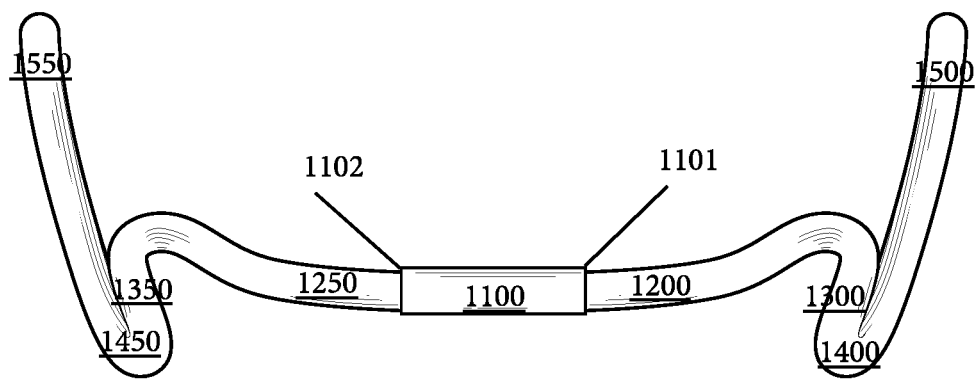
FIG. 6 is a top view of the handlebars of FIG. 1A.
Figure 7:
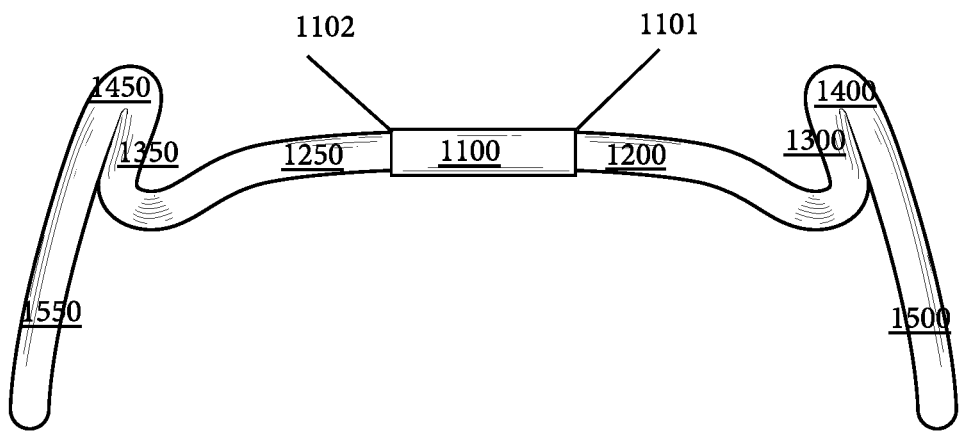
FIG. 7 is a bottom view of the handlebars of FIG. 1A.
Figure 8:
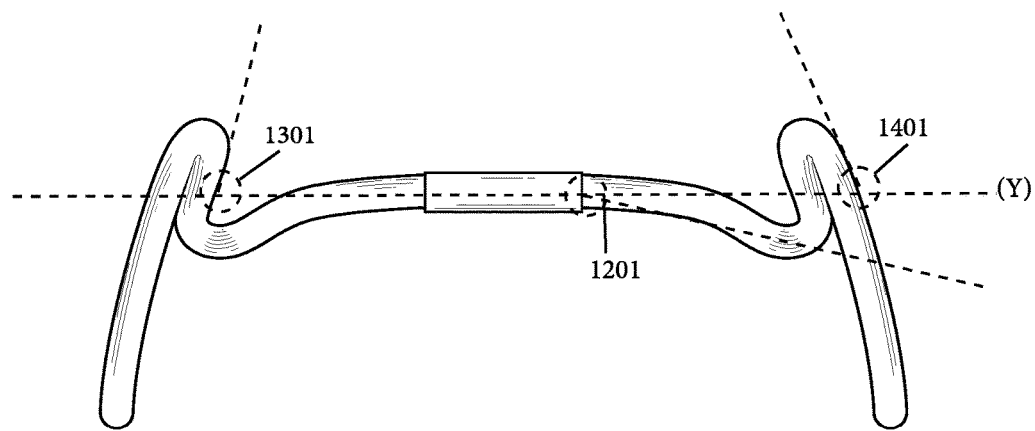
FIG. 8 is a dimensioned bottom view of the handlebars of FIG. 1A.
Figure 9:
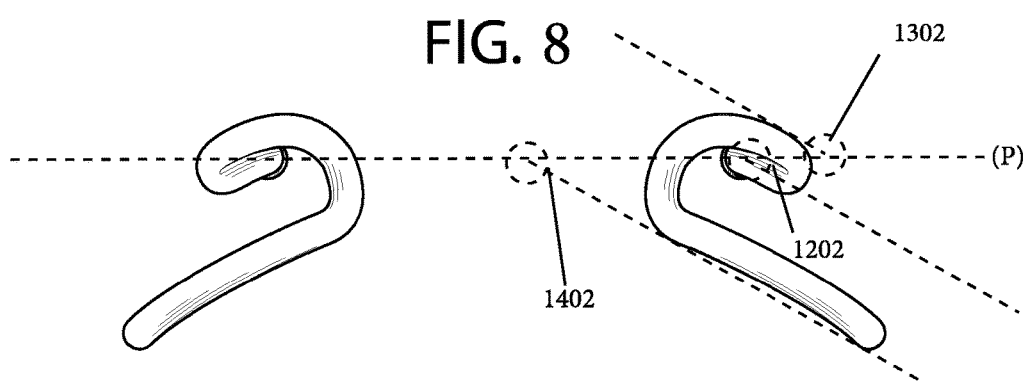
FIG. 9 is a dimensioned left and right side view of the handlebars of FIG. 1A.
Figure 10:
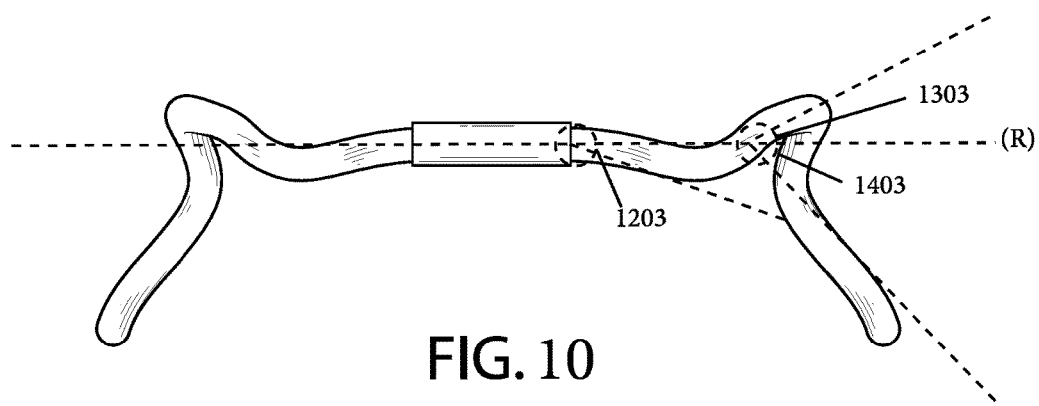
FIG. 10 is a dimensioned front view of the handle bars of FIG. 1A.

FIG. 1B is an environmental view of the handlebars 1000. FIGS. 8, 9 and 10 respectively show top and front dimensional views of the handlebars 1000. FIGS. 1B, 8, 9 and 10 show that the center bar 1100, left top 1200, and right top 1250, without more, are presented in the form of a flat bar that yaws backward (FIG. 8), rolls slightly downward (FIG. 9), and pitches slightly backward (FIG. 10). Suitably, the yaw, roll, and pitch the left and right tops 1200, 1250 define ergonomic bends according to the shape of a human hand 2100 and to accommodate gripping on the left and right sides of the center bar 1100 by the rider 2000. As depicted in FIG. 8, the yaw angle 1201 of the left top 1200 (measured from the center point on the left side of the center bar 1100 the lower most center bend point of the left top 1200) is preferably negative fifteen to negative twenty-five degrees relative to the yaw base-line (Y). A preferable yaw angle 1201 is twenty degrees. As depicted in FIG. 9, the pitch angle 1202 of the left top 1200 (measured from center line of the left top 1200) is preferably negative twenty-five to negative forty degrees relative to the pitch base-line (P). A preferable pitch angle 1202 is thirty-five degrees. Finally, as depicted in FIG. 10, the roll angle 1203 of the left top 1200 (measured from the center point on the left side of the center bar 1100 the lower most center bend point of the left top 1200) is preferably negative fifteen to negative twenty-five degrees relative to the roll base-line (R). A preferable roll angle 1203 is twenty degrees. Suitably, the right top 1250 will feature mirrored yaw, pitch, and roll angles.

Referring back to FIGS. 1A and 2 through 7, the left ramp 1300 is generally tubular and extends laterally and forward from the left side of the left top 1200. As shown, the right side of the left ramp 1300 is coupled (e.g., by welding, splicing, adhesive or unitary construction) to the left side of the left top 1200 so that the tubular axis or center of the right side of the left ramp 1300 is aligned with the left side axis of the left top 1200. As shown, the joint of the left ramp 1300 and left top 1200 is preferably seamless where the diameter of the left top 1200 and left ramp 1300 are approximately the same.

Referring still to FIGS. 1A and 2 through 7, the right ramp 1350 is generally tubular and extends laterally and forward from the right side of the right top 1250. As shown, the left side of the right ramp 1350 is coupled (e.g., by welding, splicing, adhesive or unitary construction) to the right side of the right top 1250 so that the tubular axis or center of the left side of the right ramp 1350 is aligned with the right side axis of the right top 1250. As shown, the joint of the right ramp 1300 and right top 1200 is preferably seamless where the diameter of the right top 1250 and right ramp 1350 are approximately the same.

FIGS. 1B, 8, 9 and 10 show that the left top 1200 and left ramp 1300 (or right top 1250 and right ramp 1350), without more, are presented in the form of a snaked bar that yaws inward (FIG. 8), rolls slightly upward (FIG. 9), and pitches slightly downward (FIG. 10). Suitably, the yaw, roll, and pitch the left and right ramps 1300, 1350 define ergonomic bends according to the shape of a human hand 2100 and to accommodate gripping by the rider 2000. As depicted in FIG. 8, the yaw angle 1301 of the right ramp 1350 (measured from the inner edge on the left side of the right hook 1350) is preferably seventy-five to eighty-five degrees relative to the yaw base-line (Y). A preferable yaw angle 1301 is seventy-nine degrees. As depicted in FIG. 9, the pitch angle 1302 angle of the left ramp 1300 (measured from center line of the left top 1200) the is preferably twenty-five to forty degrees relative to the pitch base-line (P). A preferable pitch angle 1302 is thirty-five degrees. Finally, as depicted in FIG. 10, the roll angle 1303 of the left ramp 1300 (measured from the top side on left ramp 1300) is preferably twenty-five to forty degrees relative to the roll base-line (R). A preferable roll angle 1303 is thirty-five degrees. Suitably, the left and right ramps 1300, 1350 will feature mirrored yaw, pitch, and roll angles.

Referring back to FIGS. 1A and 2 through 7, the left hook 1400 is generally tubular and extends forward, downward, and then backward from the left side of the left ramp 1300. As shown, the top side of the left hook 1400 is coupled (e.g., by welding, splicing, adhesive or unitary construction) to the left side of the left ramp 1300 so that the tubular axis or center of the top side of the left hook 1400 is aligned with the left side axis of the left ramp 1300. As shown, the joint of the left ramp 1300 and left hook 1400 is preferably seamless where the diameter of the left hook 1400 and left ramp 1300 are approximately the same.

Referring still to FIGS. 1A and 2 through 7, the right hook 1450 is generally tubular and extends forward, downward, and then backward from the right side of the right ramp 1350. As shown, the top side of the right hook 1450 is coupled (e.g., by welding, splicing, adhesive or unitary construction) to the right side of the right ramp 1350 so that the tubular axis or center of the top side of the right hook 1450 is aligned with the right side axis of the right ramp 1350. As shown, the joint of the right ramp 1350 and right hook 1450 is preferably seamless where the diameter of the right hook 1450 and right ramp 1350 are approximately the same.

FIGS. 1B, 8, 9 and 10 show that the left hook 1400 and left ramp 1300 (or right hook 1450 and right ramp 1350), without more, are presented in the form of a snaked bar that yaws inward (FIG. 8), rolls slightly downward (FIG. 9), and pitches slightly downward (FIG. 10). Suitably, the yaw, roll, and pitch the left and right hooks 1400, 1450 define ergonomic bends according to the shape of a human hand 2100 and to accommodate gripping by the rider 2000. As depicted in FIG. 8, the yaw angle 1401 of the left hook 1400 (measured from the outer edge on the left side of the left hook 1400) is preferably seventy-five to eighty-five degrees relative to the yaw base-line (Y). A preferable yaw angle 1401 is seventy-nine degrees. As depicted in FIG. 9, the pitch angle 1402 of the left hook 1300 (measured from center line of the left top 1200) is preferably twenty-five to forty degrees relative to the pitch base-line (P). A preferable pitch angle 1402 is thirty-five degrees. Finally, as depicted in FIG. 10, the roll angle 1403 of the left hook 1400 (measured from the top side on left hook 1400) is preferably negative twenty-five to negative sixty degrees relative to the roll base-line (R). A preferable roll angle 1403 is negative sixty degrees. Suitably, the left and right hooks 1400, 1450 will feature mirrored yaw, pitch, and roll angles.

FIGS. 11 and 12 FIG. 11 are dimensioned bottom, left and right side views of the handlebars of FIG. 1A. As shown in FIG. 11: line (b) may represent a drop of one quarter inch; line (c) is a forty degree curve; line (f) may be fourteen and a half inches from center of the bar to center of the bar; line (g) may be eighteen and one-fourth inches from center to center and line (a) may be three inches before tapering (swaging) in diameter from one and one-quarter inches to fifteen-sixteenths inches. As shown in FIG. 12: line (e) may be four and one-half inches from end of the drop to the start of the bend; and line (d) may be two and one-quarter inches surface-to-surface and three and three-sixteenths center-to-center.

Referring back to FIGS. 1A and 2 through 7, the left drop 1500 is generally tubular and extends backward from the bottom side of the left hook 1400. As shown, the front end of the left drop 1500 is coupled (e.g., by welding, splicing, adhesive or unitary construction) to the bottom side of the left hook 1400 so that the tubular axis or center of the bottom side of the left hook 1400 is aligned with the front end axis of the left drop 1500. As shown, the joint of the left drop 1500 and left hook 1400 is preferably seamless where the diameter of the left hook 1400 and left drop 1300 are approximately the same.

Referring back to FIGS. 1A and 2 through 7, the right drop 1550 is generally tubular and extends backward from the bottom side of the right hook 1450. As shown, the front end of the right drop 1550 is coupled (e.g., by welding, splicing, adhesive or unitary construction) to the bottom side of the right hook 1450 so that the tubular axis or center of the bottom side of the right hook 1450 is aligned with the front end axis of the right drop 1550. As shown, the joint of the right drop 1550 and right hook 1450 is preferably seamless where the diameter of the right hook 1450 and right drop 1350 are approximately the same.

FIG. 1B suitably shows two preferable positioning of hands during use of the depicted handlebars 1000. Suitably, the disclosed handlebars 1000 may be formed of aluminum, carbon fiber, other metals, woods, composites, or the like. The handlebars may be constructed as a single unit or assembled from separate components that are pieced together, e.g., by welding or splicing.

Although the method and apparatus is described above in terms of various exemplary embodiments and implementations, it should be understood that the various features, aspects and functionality described in one or more of the individual embodiments are not limited in their applicability to the particular embodiment with which they are described, but instead might be applied, alone or in various combinations, to one or more of the other embodiments of the disclosed method and apparatus, whether or not such embodiments are described and whether or not such features are presented as being a part of a described embodiment. Thus the breadth and scope of the claimed invention should not be limited by any of the above-described embodiments.

Terms and phrases used in this document, and variations thereof, unless otherwise expressly stated, should be construed as open-ended as opposed to limiting. As examples of the foregoing: the term "including" should be read as meaning "including, without limitation" or the like, the term "example" is used to provide exemplary instances of the item in discussion, not an exhaustive or limiting list thereof, the terms "a" or "an" should be read as meaning "at least one," "one or more," or the like, and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that might be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases might be absent. The use of the term "assembly" does not imply that the components or functionality described or claimed as part of the module are all configured in a common package. Indeed, any or all of the various components of a module, whether control logic or other components, might be combined in a single package or separately maintained and might further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives might be implemented without confinement to the illustrated examples. For example, block diagrams and their accompanying description should not be construed as mandating a particular architecture or configuration.

All original claims submitted with this specification are incorporated by reference in their entirety as if fully set forth herein. In the claims, vehicle can be a bicycle, tricycle, or other wheeled or unwheeled structure that is operated, mounted, or controlled by a human using handlebars.

PAPER "SEQUENCE LISTING"

Not applicable.

I claim:

1. Handlebars (1000) comprising:
   a center bar (1100) for coupling said handlebars (1000) to the frame of vehicle;
   at least one top (1200) that extends laterally from said center bar (1100), said top (1200) featuring
      a forty degree curve defined along a centerline (c) of the top (1200);
      a yaw angle (1201) of negative fifteen to negative twenty-five degrees relative to a yaw base-line (Y) that is defined normal to a cross-section of the center bar (1100),
      a pitch angle (1202) of negative twenty-five to negative forty degrees relative to a pitch base-line (P) that is defined radial to a cross-section of the center bar (1100), and
      a roll angle (1203) of negative fifteen to negative twenty-five degrees relative to a roll base-line (R) that is defined normal to a cross-section of the center bar (1100);
   at least one ramp (1300) that is seamlessly coupled to said top (1200), said ramp (1300) featuring
      a yaw angle (1301) of seventy-five to eighty-five degrees relative to the yaw base-line (Y),
      a pitch angle (1302) of twenty-five to forty degrees relative to the pitch base-line (P), and
      a roll angle (1303) of twenty-five to forty degrees relative to the roll base-line (R);
   at least one hook (1400) that is seamlessly coupled to said ramp (1300), said hook (1400) featuring
      a yaw angle (1401) of seventy-five to eighty-five degrees relative to the yaw base-line (Y),
      a pitch angle (1402) of twenty-five to forty degrees relative to the pitch base-line (P), and
      a roll angle (1403) of negative twenty-five to negative sixty degrees relative to the roll base-line (R); and,
   at least one drop (1500) that is seamlessly coupled to the hook (1400).

2. The handlebars (1000) of claim 1 wherein:
   said top featuring
      a yaw angle (1201) of negative twenty degrees relative to a yaw base-line (Y),
      a pitch angle (1202) of negative thirty five degrees relative to a pitch base-line (P), and
      a roll angle (1203) of negative twenty degrees relative to a roll base-line (R).

3. The handlebars (1000) of claim 1 wherein:
   said ramp (1300) featuring
      a yaw angle (1301) of seventy-nine degrees relative to the yaw base-line (Y),
      a pitch angle (1302) of thirty-five degrees relative to the pitch base-line (P), and
      a roll angle (1303) of thirty-five degrees relative to the roll base-line (R).

4. The handlebars (1000) of claim 1 wherein:
   said hook (1400) featuring
      a yaw angle (1401) of seventy-nine degrees relative to the yaw base-line (Y),
      a pitch angle (1402) of thirty-five degrees relative to the pitch base-line (P), and
   a roll angle (1403) of negative sixty degrees relative to the roll base-line (R).

* * * * *